United States Patent [19]
Johnson et al.

[11] 3,812,211
[45] May 21, 1974

[54] PROCESS FOR THE REACTION OF BROMOALKANES WITH INORGANIC CHLORIDES

[75] Inventors: Morris A. Johnson; Kang Yang, both of Ponca City, Okla.

[73] Assignee: Continental Oil Company, Ponca City, Okla.

[22] Filed: July 16, 1971

[21] Appl. No.: 163,438

[52] U.S. Cl............................................ 260/658 R
[51] Int. Cl.......................................... C07c 17/20
[58] Field of Search................................ 260/658 R

[56] References Cited
UNITED STATES PATENTS 3,641,172  2/1972  Johnson et al.............. 260/658 R
3,410,917  11/1968  Louw........................... 260/658 R

*Primary Examiner*—Leon Zitver
*Assistant Examiner*—Joseph A. Boska
*Attorney, Agent, or Firm*—Ronald J. Carlson

[57] ABSTRACT

The present invention relates to a method for conducting the reaction between bromoalkanes and inorganic chlorides wherein the reactions are heated in a reaction vessel in the presence of an activated charcoal catalyst.

2 Claims, No Drawings

PROCESS FOR THE REACTION OF BROMOALKANES WITH INORGANIC CHLORIDES

BACKGROUND OF THE INVENTION

1. Field of the Invention

The present invention relates generally to reactions between bromoalkanes and inorganic chlorides.

2. Description of the Prior Art

The use of activated carbon in chlorination and dehydrochlorination is well known but the use of activated carbon as a catalyst in reactions between bromoalkanes and inorganic chlorides has not been reported. It is known that methane can be chlorinated by passing a mixture of chlorine and methane through a contact mass consisting essentially of activated carbon and graphite.

Activated carbon has been used as a catalyst in the process of preparing trifluoromethyl fluoroformate and bistrifluoromethyl carbonate wherein carbonyl fluoride is contacted with said activated carbon catalyst. Also activated charcoal has been used as a carrier for metal halide catalyst of the Friedel-Crafts type for the reaction of a halo-olefin with an isoparaffin. In addition activated carbons have been used as a catalyst to effectuate the reaction between trifluoroacetyl chloride and trifluoroethanol vapors to produce trifluoroethyltrifluoroacetate.

SUMMARY OF THE INVENTION

The present invention relates to a process for conducting the reaction between bromoalkanes and inorganic chlorides. The process involves heating the reactants, to wit: bromoalkanes and inorganic chlorides, such as sodium chloride, zinc chloride, and hydrochloric acid, in a reacton vessel in the presence of an activated charcoal catalyst.

DETAILED DESCRIPTION

Broadly described, this invention is a process for conducting the reaction between bromoalkanes and inorganic chlorides wherein the reactants are heated in a reaction vessel in the presence of an activated charcoal catalyst.

Bromoalkanes suitable for this process are those having the formula RBr where R is an alkyl group ranging from methyl to high molecular weight alkyl groups less heavy than polymers. The preferred range of R is C-1 to C-20, and the most preferred range is C-1 to C-10. R can also be branched and have other substituents so long as these do not interfere or compete with the reaction.

Suitable inorganic chlorides are: sodium chloride, zinc chloride, hydrochloric acid, potassium chloride, lithium chloride, magnesium chloride, calcium chloride, ammonium chloride, phosphonium chloride, and other metal chloride salts of similar nature which are not prohibited by cost considerations.

The upper temperature limit for this reaction is dependent only on the stability of reactants and products, and not on the catalyst itself. This is a decided advantage of this catalyst over others, for example the quaternary ammonium and phosphonium salts. The preferred temperatures for operation of this catalyst range from ambient to about 300 degrees C, and the most preferred temperatures are from about 100 degrees C to about 200 degrees C.

Pressure is strictly a function of the vapor pressure of the reactants, products and solvents. The methyl bromide case is the case involving the highest pressure simply because of the volatility of methyl chloride.

Ratios of reactants require no fixed limits. It is generally preferable to use an excess of one reactant in order to drive reaction of the other reactant more nearly to completion. Practical limits would indicate a mole ratio of from about 10:1 to about 1:10 or inorganic chloride to bromoalkane. Other methods of driving the reaction to completion include the well known methods of removing one product from the reaction mixture.

The charcoal catalyst is quite inexpensive, and economic considerations on upper limit of catalyst ratio is not as acute as in other processes. Activity, however, is sufficiently high that large quantities are not necessary. Lower limits of catalyst needed are readily determinable. The upper limit is a practical one; simply the point where reactor size becomes unwieldy, or mechanical losses of product from simple physical capture become important.

The following example illustrates the process of this invention.

EXAMPLE

To a 100 ml autoclave was added 10.00 g activated charcoal, 24 g of saturated aqueous sodium chloride solution, and 9.35 g 1,2-dibromoethane. The reactor was heated to 150 degrees C with shaking at 250 rpm and for an additional 10 minutes after reaching temperature. The volatile products were then slowly distilled in one hour's time into a glass trap cooled to liquid nitrogen temperature. The trap contained 0.5040 g n-octane which was used as an internal g.c. standard.

The product was quickly warmed to melting and was transferred into a chilled bottle fitted with a septum stopper. The trap was washed with n-pentane and this was added to the product container. Analysis of the organic phase indicated the following yield: 0.95 g 1,2-dichloroethane; 1.15 g 1-bromo-2-chloroethane; 5.63 g 1,2-dibromoethane (96 percent recovery as ethyl group, 44 percent conversion of 1,2-dibromethane).

In the above example, control experiments were run without the presence of the charcoal catalyst. In each case where no charcoal catalyst was utilized the yield of products in the reaction was, within experimental error, essentially zero.

This specific example should, however, in no way be taken to narrow the broad scope of this invention, namely the reaction between inorganic chlorides and alkyl bromides catalyzed by the presence of activated charcoal. It is obvious to anyone skilled in the art that the specifically listed reactions are not the only reactions which could be catalyzed by the presence of activated charcoal. For example, MCl and RBr reacting to give RCl and MBr proceed as described by our invention where R is an alkyl group ranging from methyl to high molecular weight alkyl groups less heavy than polymers. The preferred range of R is C-1 to C-20, and the most preferred range is C-1 to C-10. The chief limitation on the size of R would appear to be solubility in the reaction mixture and diffussion rate. Further R can be branched, and have other substituents so long as these do not interfere or compete with the reaction. M is a cation such as sodium, potassium, lithium, calcium, magnesium, zinc, ammonium, phosphonium or hydrogen. MCl can also be other metal chlorides of a similar nature which are not prohibited by cost considerations.

Although certain specific embodiments of the invention have been described as exemplary of its practice, the example is not intended to limit the invention in any way. Other process parameters and materials may be used in accordance with the board principles outlined herein and when so used are deemed to be circumscribed by the spirit and scope of the invention except as necessarily limited by the appended claims or reasonable equivalents thereof.

What is claimed is:

1. A process for conducting a halogen exchange reaction between a bromoalkane and an inorganic chloride; said bromoalkane being 1,2-dibromoethane or an alkylbromide having 1 to 20 carbon atoms and said inorganic chloride being sodium chloride, zinc chloride, hydrochloric acid, potassium chloride, lithium chloride, calcium chloride, magnesium chloride, ammonium chloride or phosphonium chloride; which process comprises reacting said bromoalkane and an aqueous solution of said inorganic chloride in a two-phase liquid reaction system in the presence of activated charcoal at temperatures in the range of ambient temperature to 300°C.

2. The process of claim 1 wherein the temperature is between about 100 degrees C and about 200 degrees C.

* * * * *